US008371460B2

(12) United States Patent
Ghatikar et al.

(10) Patent No.: US 8,371,460 B2
(45) Date of Patent: Feb. 12, 2013

(54) MODULAR PANEL MOUNTING SYSTEMS

(75) Inventors: Venugopal R. Ghatikar, Salt Lake City, UT (US); William Gatti, Sandy, UT (US); Michael Damen, Rochetoirin (FR); Guillaume Martin, Rochetoirin (FR)

(73) Assignee: 3form, Inc., Salt Lake City, UT (US)

( * ) Notice: Subject to any disclaimer, the term of this patent is extended or adjusted under 35 U.S.C. 154(b) by 0 days.

(21) Appl. No.: 13/427,996

(22) Filed: Mar. 23, 2012

(65) Prior Publication Data
US 2012/0193502 A1 Aug. 2, 2012

Related U.S. Application Data

(63) Continuation of application No. 12/028,584, filed on Feb. 8, 2008, now Pat. No. 8,167,152.

(60) Provisional application No. 60/888,821, filed on Feb. 8, 2007.

(51) Int. Cl.
*A47F 5/00* (2006.01)
*A47F 5/14* (2006.01)
*E04H 1/00* (2006.01)

(52) U.S. Cl. ............................ 211/175; 52/239; 211/182

(58) Field of Classification Search .................. 211/192, 211/196, 187, 189, 86.01, 175, 182, 204, 211/206; 52/239, 241; 160/135, 351; 403/254, 403/261, 257–259; 248/220.21, 235, 121, 248/295.11
See application file for complete search history.

(56) References Cited

U.S. PATENT DOCUMENTS

| | | | |
|---|---|---|---|
| 1,382,505 A | | 6/1921 | Hargey |
| 2,903,227 A | | 3/1955 | De Kalb Key |
| 3,221,678 A | | 12/1965 | Doherty |
| 3,370,389 A | * | 2/1968 | Macaluso ...................... 52/239 |
| 3,451,183 A | * | 6/1969 | Lespagnol et al. ........... 52/656.1 |
| 3,762,116 A | | 10/1973 | Anderson et al. |
| 3,771,466 A | * | 11/1973 | Ferdinand et al. ............ 108/109 |
| 3,834,092 A | * | 9/1974 | Whisson ........................ 52/36.4 |
| 4,145,849 A | | 3/1979 | Shindoll et al. |
| 4,188,758 A | | 2/1980 | Swann |
| 4,458,461 A | * | 7/1984 | Holley ............................ 52/239 |
| 4,516,619 A | | 5/1985 | Hasbrouck |
| 4,652,170 A | * | 3/1987 | Lew .............................. 403/381 |
| 4,819,817 A | | 4/1989 | Mar |
| 5,067,294 A | * | 11/1991 | McGowan ..................... 52/241 |
| 5,095,862 A | | 3/1992 | Murphy |
| 5,139,160 A | | 8/1992 | Romano |
| 5,148,928 A | | 9/1992 | Arnold |
| 5,558,501 A | | 9/1996 | Wang et al. |

(Continued)

OTHER PUBLICATIONS

Fluowall Online Brochure, Author Unknown, Guardamiglio, Italy [online] [retrieved on Mar. 25, 2008], 12 pgs. Retrieved from the Internet URL: http://www.fluowall.it/fluowall.html.

(Continued)

*Primary Examiner* — Jonathan Liu
*Assistant Examiner* — Patrick Hawn
(74) *Attorney, Agent, or Firm* — Workman Nydegger (57) ABSTRACT

A variable angle panel mounting system can include at least one variable-angle panel mounting member, which in turn includes an elongate support member and an angularly-adjustable mounting plate adapted to secure an end of the elongate support member to a plurality of mounting surface angles. In some embodiments, the variable angle panel mounting system may also include a pressure-fit mounting system. These components can provide the ability to angularly and vertically adjust the variable-angle panel mounting member between opposing support surfaces.

20 Claims, 7 Drawing Sheets

U.S. PATENT DOCUMENTS

| | | | |
|---|---|---|---|
| 5,826,847 | A | 10/1998 | Warner et al. |
| 5,924,469 | A * | 7/1999 | Whittemore ............... 160/368.1 |
| 6,055,912 | A * | 5/2000 | Doud et al. .................. 108/110 |
| 6,241,108 | B1 | 6/2001 | Nakatani |
| 6,443,319 | B1 | 9/2002 | Sander |
| 6,592,194 | B2 * | 7/2003 | Lininger et al. ........... 312/257.1 |
| 6,688,238 | B1 | 2/2004 | Alexiou |
| 7,165,690 | B2 * | 1/2007 | Wu ............................... 211/192 |
| 7,293,667 | B2 | 11/2007 | Flynn |
| 2004/0173551 | A1 | 9/2004 | Wu |
| 2004/0226903 | A1 | 11/2004 | Wang |
| 2005/0205509 | A1* | 9/2005 | Flynn ........................... 211/189 |
| 2006/0096224 | A1* | 5/2006 | Asbury ........................ 52/582.1 |

OTHER PUBLICATIONS

Sorbetti Online Display Brochure, Author Unknown, [online] [retrieved on Mar. 25, 2008], 45 pgs. Retrieved from the Internet URL: http://www.bnind.com/sorbetti.asp.

Sorbetti Online Tech Specs, Author Unknown, [online] [retrieved on Mar. 25, 2008], 12 pgs. Retrieved from the Internet URL: http://www.bnind.com/downloads/pdfs/BN_Sorbetti_TechSpecs.pdf.

USPTO, Office Action in U.S. Appl. No. 12/028,584, mailed Oct. 19, 2010, 11 pages.

USPTO, Office Action in U.S. Appl. No. 12/028,584, mailed Jun. 30, 2011, 9 pages.

* cited by examiner

MODULAR PANEL MOUNTING SYSTEMS

CROSS-REFERENCE TO RELATED APPLICATIONS

This application is a continuation of U.S. patent application Ser. No. 12/028,584 filed on Feb. 8, 2008 and entitled "Variable Height and Angle Panel Mounting Systems, Methods, and Apparatus," which claims the benefit of and priority to U.S. Provisional Application No. 60/888,821, filed on Feb. 8, 2007, entitled "Modular Panel Mounting Systems and Apparatus." The entire content of the above-mentioned patent applications is incorporated by reference herein.

BACKGROUND OF THE INVENTION

1. The Field of the Invention

This invention relates to systems, methods, and apparatus for mounting and/or displaying panel structures as partitions, displays, barriers, or treatments.

2. Background and Relevant Art

Some recent architectural designs have implemented synthetic, polymeric resins, which can be used as partitions, displays, barriers, or treatments etc. Present polymeric resin materials generally used for creating these resin panels comprise polyvinyl chloride or "PVC"; polyacrylate materials such as acrylic, and poly (methylmethacrylate) or "PMMA"; polyester materials such as poly (ethylene-co-cyclohexane 1,4-dimethanol terephthalate), or "PET"; poly (ethylene-co-cyclohexane 1,4-dimethanol terephthalate glycol) or "PETG"; glycol modified polycyclohexylenedimethlene terephthalate; or "PCTG"; as well as polycarbonate materials.

In general, resin materials such as these are now popular compared with decorative cast or laminated glass materials, since resin materials can be manufactured to be more resilient and to have a similar transparent, translucent, or colored appearance as cast or laminated glass, but with less cost. Decorative resins can also provide more flexibility compared with glass at least in terms of color, degree of texture, gauge, and impact resistance. Furthermore, decorative resins have a fairly wide utility since they can be formed to include a large variety of artistic colors, images, and shapes.

As mentioned above, one particular use of decorative resins can be in the panel form, where the panel might be used in conjunction with a panel mounting system as part of a partition, display, barrier, or treatment. One conventional type of panel mounting system includes a pair of standards or upright posts with one or more panels mounted therebetween. For example, a manufacturer then uses bracket-like elements to secure each panel between the pair of upright posts, such as using one or more bracket elements joined to the standards or uprights mounted to the panel by fastening elements. The manufacturer further secures these uprights posts to the floor, ceiling and/or a wall via one or more opposing rigid mounting plates.

Unfortunately, conventional panel mounting systems such as these tend to suffer from a number of drawbacks. In particular, these types of conventional mounting systems generally tend not to provide much flexibility in terms of mounting style or arrangement since they can be erected in only a limited number of configurations, and typically require complicated hardware and installation processes. Specifically, conventional mounting systems tend to either come only in standard sizes, or come in specifically "made to order" configurations that have limited use. One will appreciate that such limitations can be particularly problematic when panels are used in temporary settings, such as trade shows.

Additionally, because conventional panel mounting systems require complicated hardware and installation processes they are not readily assembled and disassembled. For example, conventional panel mounting systems often need to be secured to standard mounting surfaces that are substantially-vertical and substantially horizontal surfaces at 90° angles, such as vertical walls and/or horizontal floors and ceilings. Without specialized designs, however, such mounting systems may be ill-suited for use on surfaces that may be arched, curved, or angled. When conventional uprights are mounted to non-standard mounting surfaces the uprights are often misaligned, making suspension of a panel therebetween impossible or at the very least requiring expensive and time taking modifications and complicated installation procedures.

Along similar lines, another drawback of conventional panel mounting systems is that they tend to employ very little (or no) vertical adjustability. This enhances the need for manufacturers to be well aware of all possible floor-to-ceiling dimensions, and any variations thereto, when preparing a structure for a particular design space. Such information about dimensions in a new space, however, can be often difficult to come by with great specificity, particularly where a large amount of space needs to be considered. Furthermore, in the event there are any inaccuracies, or mismatches, it can be fairly expensive to retool and manufacture new mounting apparatus for that space.

Accordingly, there are a number of disadvantages in panel mounting systems that can be addressed.

BRIEF SUMMARY OF THE INVENTION

Implementations of the present invention provide systems, methods, and apparatus for mounting panels as partitions, displays, barriers, or treatments with a great deal of versatility, almost regardless of the dimensions of any given design space. In particular, implementations of the present invention provide mounting apparatus that can be used in a wide variety of configurations, and secured to a wide variety of surfaces including non-standard mounting surfaces. In one implementation, for example, implementations of the present invention include panel mounting systems and components that are angularly and/or vertically-adjustable. The angularly and vertically-adjustable mounting systems and components can then be used to mount panels in a wide range of design spaces, almost regardless of dimensional variations and surface mounting features.

For example, a mounting member in accordance with at least one implementation of the present invention for mounting one or more panels to any of a partition, display, treatment, or barrier, can include an elongate support member. The mounting member can also include a first mounting plate adapted to secure a first end of the elongate support member to a first mounting surface. In addition, the mounting member can include an angularly-adjustable mounting plate adapted to secure an opposing second end of the elongate support member to a plurality of mounting surface angles, while also securing the elongate support member in a substantially-vertical orientation. Furthermore, the mounting member can include at least one mounting channel formed in the elongate support member adapted to receive at least one panel.

In addition, a system for mounting a plurality of panels differentially between a plurality of opposing surfaces, can include a plurality of elongate support members aligned in a substantially-vertical orientation between a corresponding plurality of opposed support and upper surfaces. The system can also include a first mounting plate used to secure each first end of each elongate support member to a support surface. In addition, the system can include an angularly-adjustable mounting plate that secures each second end of each elongate support member to an opposed upper surface. In this case, each of the elongate support members is individually adjusted in height and angle between the opposed support and upper surfaces. Furthermore, the system can include a plurality of panels secured by the plurality of elongate support members.

A method of securely assembling a partition, display, treatment, or barrier between the opposing mounting surfaces, can involve securing a first end of an elongate mounting member to a first mounting surface via a first mounting plate. The method can also involve adjusting an angle of an angularly-adjustable mounting plate mounted to the elongate mounting member. The angularly-adjustable mounting plate is essentially flush with an angled mounting surface opposed to the first mounting surface. In addition, the method can involve securing a second end of the elongate mounting member to the angled mounting surface via the angularly-adjustable mounting plate. The elongate mounting member is secured in a substantially-vertical orientation. Furthermore, the method can involve mounting at least one panel to the elongate mounting member.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatus for mounting panels as partitions, displays, barriers, or treatments with a great deal of versatility, almost regardless of the dimensions of any given design space. In particular, implementations of the present invention provide mounting apparatus that can be used in a wide variety of configurations, and secured to a wide variety of surfaces including non-standard mounting surfaces. In one implementation, for example, implementations of the present invention include panel mounting systems and components that are angularly and/or vertically-adjustable. The angularly and vertically-adjustable mounting systems and components can then be used to mount panels in a wide range of design spaces, almost regardless of dimensional variations and surface mounting features.

As will be appreciated more fully herein, these components, when coupled or mounted with one or more panels, can provide the ability to mount the panels to both non-standard mounting surfaces oriented at any of a plurality of angles. Implementations of the present invention also include a number of components that can be used to mount panels between opposing surfaces separated by plurality of distances. Accordingly, at least one advantage of the present invention is it that assemblers of panels can mount panels as partitions, barriers, or treatments, etc. in virtually any support structures without necessarily needing to have a complete knowledge of the various dimensional details of their space.

Figure 1:
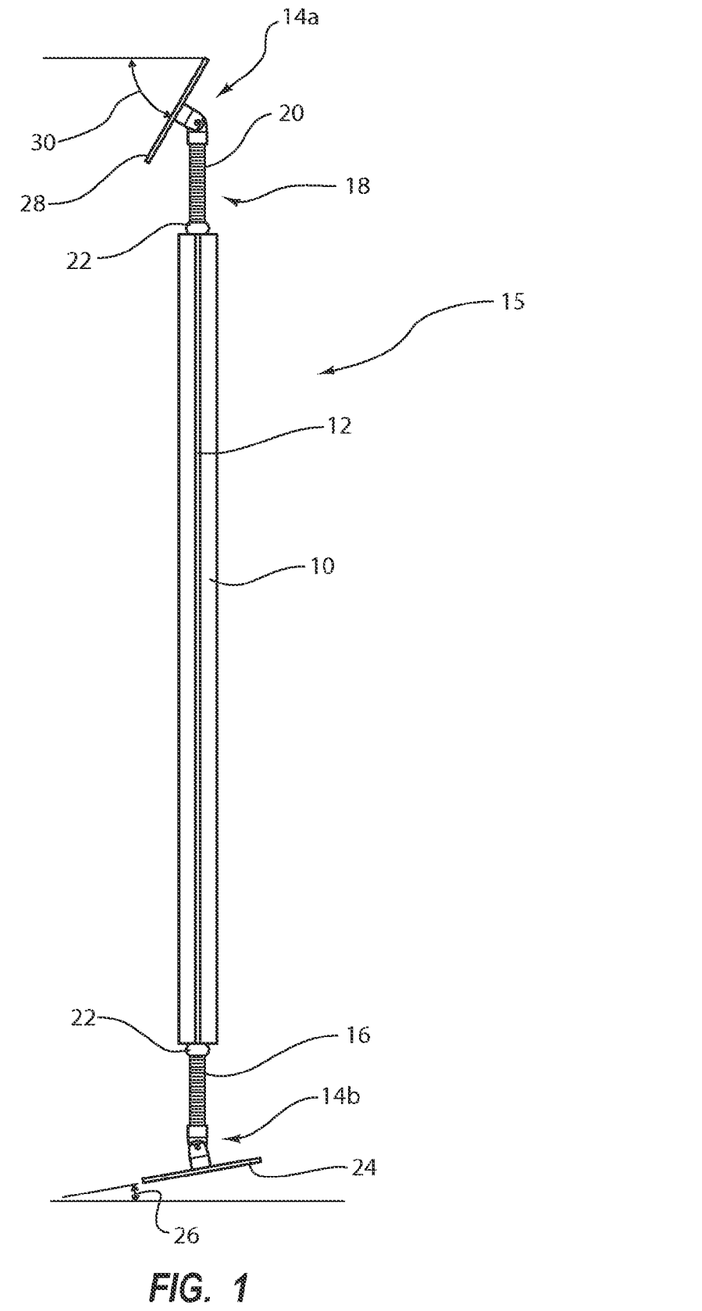
FIG. 1 illustrates an angularly and vertically-adjustable panel mounting member in accordance with an implementation of the present invention.

FIG. 1 illustrates an implementation of a variable-angle panel mounting member 15 adapted to be secured between an upper interface, such as a ceiling, and a support surface, such as a floor, via opposing mounting surfaces 24, 28. In general, FIG. 1 illustrates that the variable-angle panel mounting member 15 comprises an elongate support member 10 with a variable-angle mounting plates 14a, 14b secured to opposing ends thereof. In addition, FIG. 1 shows that the elongate support member 10 includes a mounting channel 12, which can be used to secure one or more panels. As used herein, the term "panel" refers primarily to resin-based panels, such as panels comprising polycarbonates, copolyesters, acrylics, or mixtures thereof, and also to non-resin based panels, such as those based partly or entirely from glass or glass composites.

Figure 2:
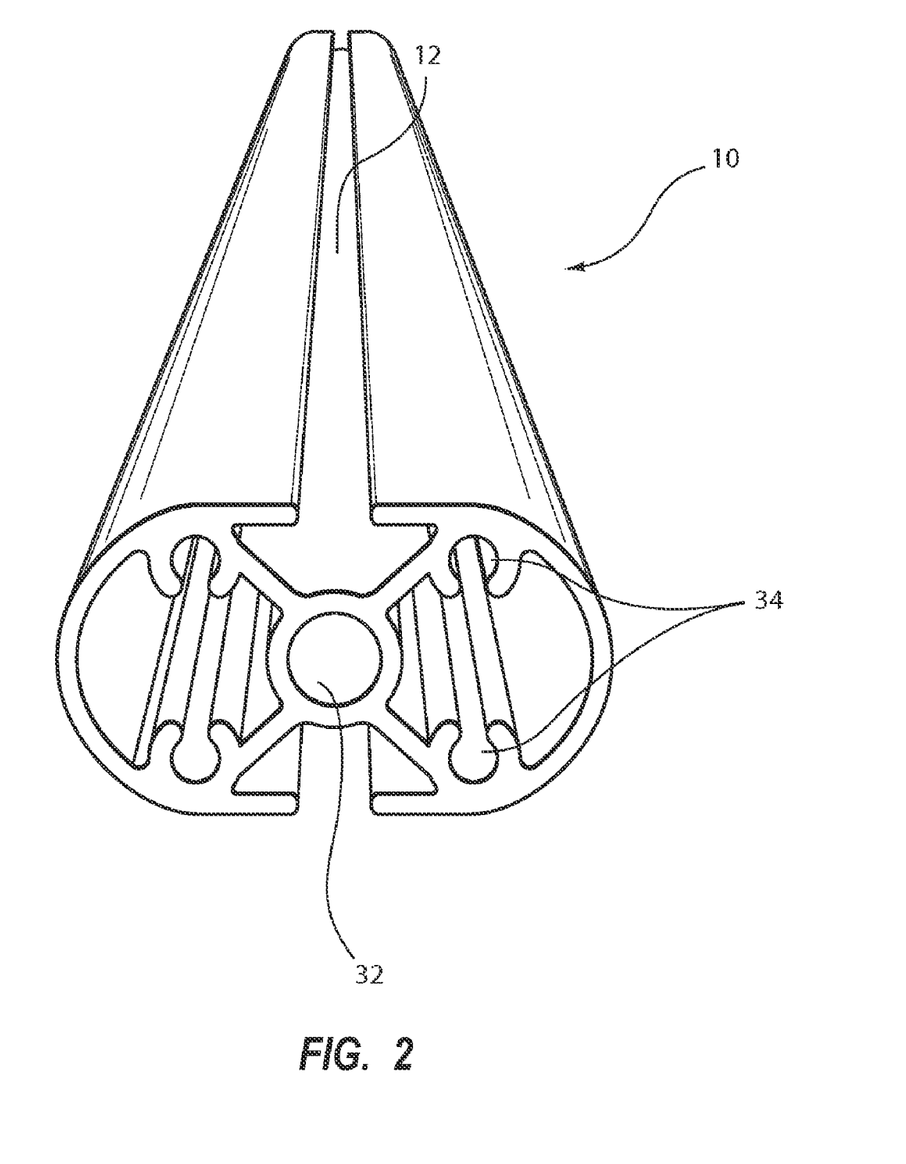
FIG. 2 illustrates a top perspective view of an elongate support member used in the panel mounting member of FIG. 1.
Figure 3:
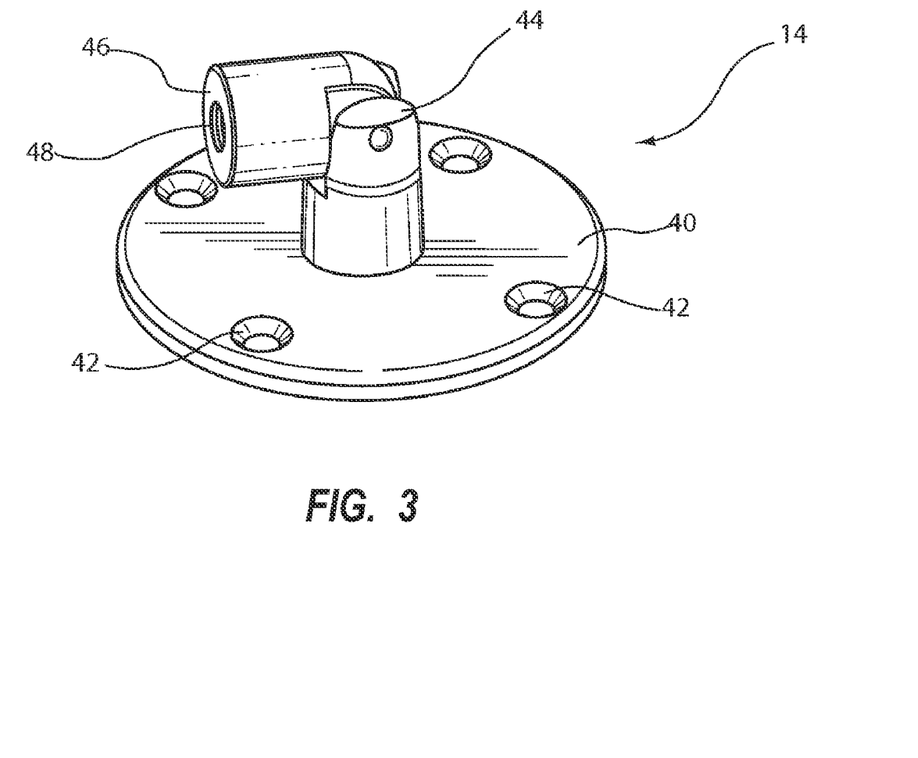
FIG. 3 illustrates a perspective view of an angularly-adjustable mounting plate in accordance with an implementation of the present invention.
Figure 4:
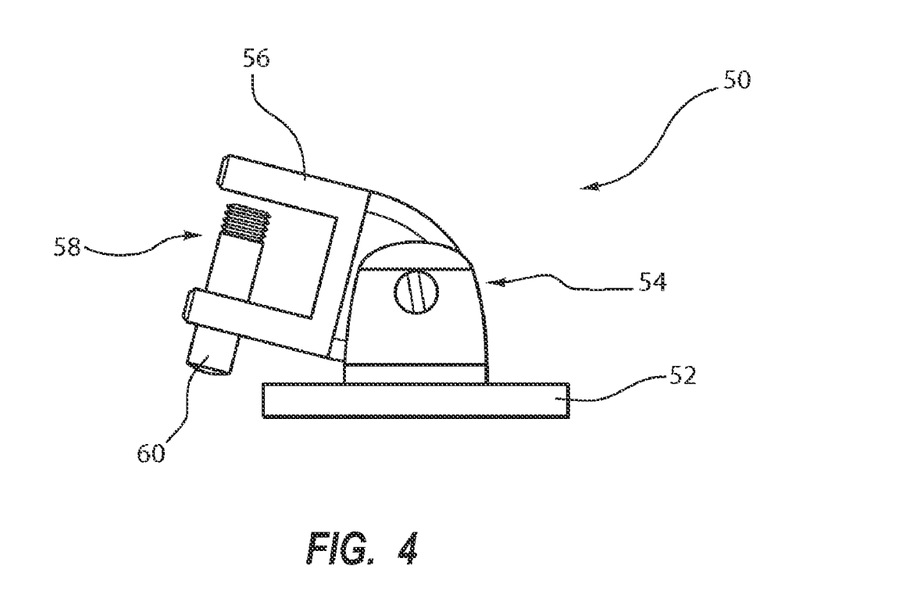
FIG. 4 illustrates a side view of another angularly-adjustable mounting plate in accordance with an implementation of the present invention.

FIGS. 2-4, and the corresponding text, illustrate or describe a number of different additional details and features/uses of the mounting member 15 shown in FIG. 1. For example, FIG. 2 illustrates a top perspective view of the elongate support member 10. As a preliminary matter, one will appreciate that the elongate support member 10 may be formed from extruded aluminum. Of course, the elongate support member 10 may be formed from any suitable material that is both light weight and strong, and provides an appropriate aesthetic.

FIG. 2 illustrates at least one implementation in which the elongate support member 10 can have an oval cross-section when viewed from the top. Of course, other cross-sectional shapes are also possible, including primarily circular, square, rectangular, or even more-complex shapes. In addition, FIG. 2 shows that the elongate support member 10 may include two mounting channels 12 extending into each major surface. Each mounting channel 12, in turn, may be configured to receive a panel directly, or otherwise receive a panel mounting bracket, such as the brackets 70 and 76 described herein with reference to FIGS. 7 and 8. In addition, FIG. 2 shows that the elongate support member 10 may include a center through-hole 32 and threaded receivers 34 configured to received fasteners.

Referring again to FIG. 1, each of the variable-angle mounting plates 14a, 14b can be secured to the through-hole 32 of the elongate support member 10 via threaded-rods 16, 20. The variable-angle panel mounting member 15 is adapted to be mounted to at least one non-standard mounting surface or interface. As used herein, "non-standard mounting surface" means a surface that is not substantially horizontal or vertical such as, for example, angled and uneven floor surfaces, and arched, curved, and angled walls and ceiling surfaces.

Each variable-angle mounting plate 14 of the variable-angle panel mounting member 15 is configured to be adjustable in order to be mounted to one or more of a plurality of angles and orientations in the various surfaces. As illustrated in FIG. 1, for example, the variable-angle panel mounting member 15 is secured between two non-standard mounting surfaces 24, 28. In other implementations, however, one or both of the surfaces to which the variable-angle panel mounting member 15 can be mounted can be "standard," i.e., substantially-vertical or substantially horizontal.

FIG. 3 illustrates a perspective view of a variable-angle mounting plate 14. In general, as illustrated in FIG. 3, each variable-angle mounting plate 14 includes a base 40 adapted to be secured to a mounting surface (ceiling, wall, or floor) via one or more fasteners, which can be secured via holes 42. Each variable-angle mounting plate 14 can also include a female connection member 46 pivotally secured to the base 40 via a pivot member 44. The pivot member 44 allows the female connection member 46 to pivot through at least a 180 degree range with respect to the base 40. Furthermore, in some embodiments the pivot 44 may be configured to swivel through a 360 degree range with respect to the base 40. The female connection member 46 can also include a threaded through-hole 48 for receiving a threaded-rod (e.g., 20). Also, while not shown, the female connection member can include a set screw—or means of locking or fixing—a threaded-rod within the threaded through-hole 48.

FIG. 4 illustrates a side-view of another embodiment of a variable-angle mounting plate 50. Similar to the variable-angle mounting plate 14 illustrated in FIG. 3, the variable-angle mounting plate 50 can also include a base 52, which is configured to be secured to a mounting surface, and a female connection member 56 secured to the base 52 via a pivot 54. Furthermore, in some embodiments the pivot 54 may be configured to swivel through a 360 degree range with respect to the base 52. As shown in FIG. 4, however, the female connection member 56 can include a receiving portion 58 configured to directly receive and secure a panel therein. The variable-angle mounting plate 50 can also include a set screw 60 configured to secure a panel within the receiving portion 58.

As shown in FIG. 1, therefore, the base 40 of the top variable-angle mounting plate 14a is secured to the mounting surface 28, which can be oriented at an angle 30 from the horizontal. The pivot 44 allows the variable-angle mounting plate 14 to be mounted to the angled surface 28, and still hold the threaded-rod 20, and in turn the elongate support member 10, in a vertical orientation. Thus, the variable-angle mounting plates 14a, 14b allow the variable-angle panel mounting member 15 to be secured in a vertical orientation between two opposing surfaces, regardless of whether the surfaces are standard or non-standard mounting surfaces. Thus, as shown in FIG. 1, the variable-angle panel mounting member 15 can be mounted between an uneven floor surface 24 offset from the horizontal by angle 26 and the ceiling surface 28 offset from the horizontal by angle 30.

The variable-angle panel mounting member 15, illustrated in FIG. 1, can also be adapted to be secured between opposing surfaces spaced apart by a range of distances. In particular, the variable-angle panel mounting member 15 can include a height-adjustable mounting system 18, which can be vertically adjusted via one or more pressure fit assemblies (e.g., a "pressure fit mounting system"). Along these lines, FIG. 1 shows that a pressure-fit mounting system 18 can include a threaded-rod 20 secured to, for example, a variable-angle mounting plate 14 on one end, and the through-hole 32 of the elongate support member 10. The pressure-fit mounting system 18 can also include a barrel nut 22, which can be threaded on to the threaded-rod 20 (and can be positioned inside or outside the support member 10). A manufacturer can also use barrel nut 22 with threaded-rod 16 to prevent the threaded rod 20 from slipping up into the elongate support member.

Once threaded to the threaded-rod 20, the barrel nut 22 can be translated by rotation towards the elongate support member 10 which causes the variable-angle mounting plate 14, secured to the distal end of the threaded-rod 20, to be moved vertically toward the mounting surface 28. Thus, an assembler can manipulate the pressure-fit mounting system 18 to move the variable-angle mounting plate 14 vertically toward the mounting surface 28 until the variable-angle panel mounting member 15 is in tension between opposing mounting surfaces 24, 28. Of course, one will appreciate that the manufacturer/assembler can also include a pressure-fit mounting system 18 on both top and bottom portions of the elongate support member 10, as needed. In such a case, the assembler could thus adjust both top and bottom portions through rotational motion as described above.

In at least one implementation, the pressure-fit mounting system 18 has adjustable range of from about three inches (3") to about feet (3'). In additional or alternative implementations, the adjustability range of the pressure-fit mounting system 18 can be approximately one and a half feet (1.5'). The pressure-fit mounting system 18 thus allows the variable-angle panel mounting member 15 to be mounted between opposing surfaces offset by a wide range of distances.

While the embodiment of the pressure-fit mounting system 18 shown in FIG. 1 incorporates a threaded-rod 20 and a barrel nut 22, in other embodiments not shown, the pressure-fit mounting system 18 can comprise other mechanisms that can allow the variable-angle mounting plate 14 to be vertically adjustable with respect to the elongate support member 10. For example, in some embodiments, the pressure-fit mounting system 18 can comprise a spring-loaded assembly (not shown) that is secured to the top of the elongate support member 10. In such an embodiment, the spring-loaded assembly biases the variable-angle mounting plate 14 between the elongate support member 10 and the support surface 28.

In yet further embodiments, the pressure-fit mounting system 18 can comprise an extrusion into which the elongate support member 10 can telescopically fit. In such an embodiment, the extrusion can slide up from the elongate support member 10 until a variable-angle mounting plate 14 that is attached to a distal end thereof reaches the mounting surface 28. The extrusion can then be locked in relation to the elongate support member 10 by a fastener, set screw, or other locking means.

Figure 5:
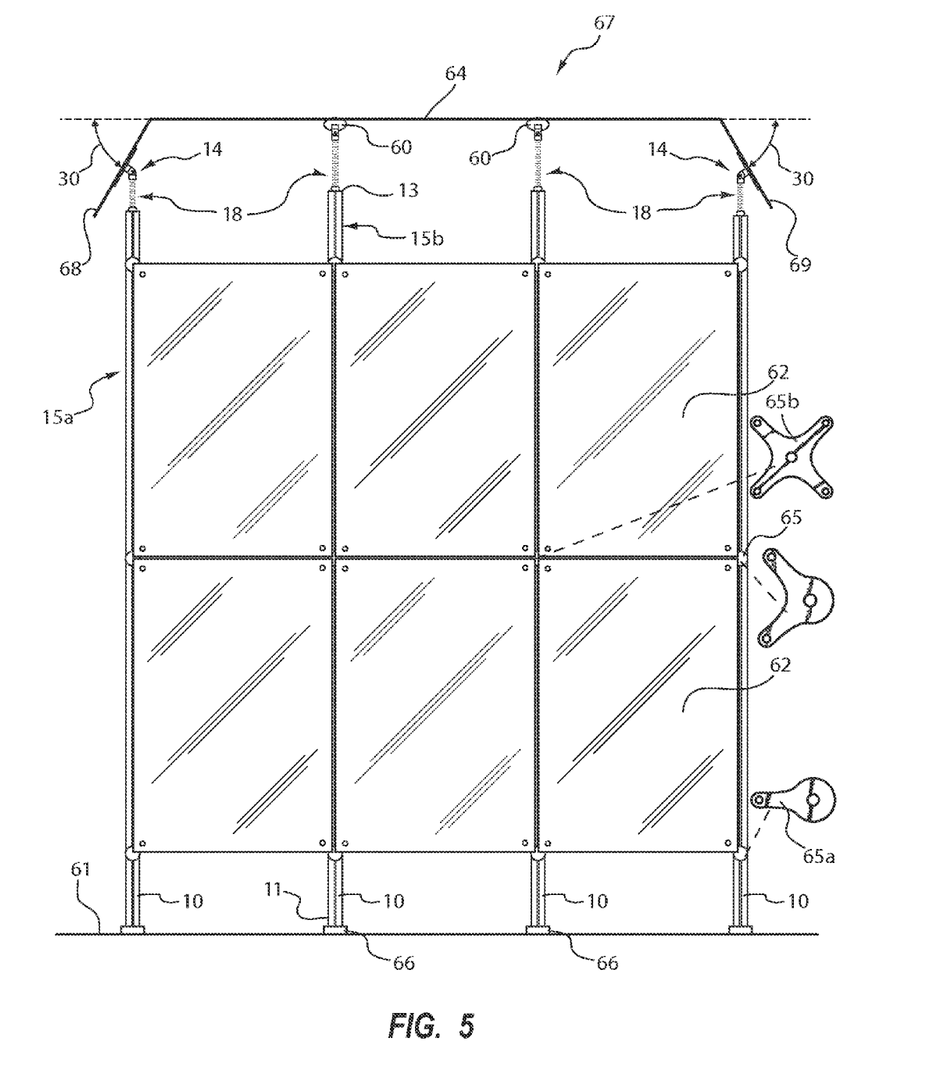
FIG. 5 illustrates a schematic diagram in accordance with one or more implementations of the present invention in which a plurality of panels are mounted as a partition to both standard and non-standard mounting surfaces.

FIG. 5 illustrates a schematic diagram of a system 67 comprising plurality of panels 62 that are mounted as a partition, and secured in two instances to non-standard mounting surfaces 68, 69. As shown, the system 67 system can be configured for mounting the plurality of panels differentially between a plurality of opposing surfaces 61, 64, 68, 69. In other words the system 67 can be configured to mount a plurality of variable-angle panel mounting members between opposing surfaces, where each variable-angle panel mounting member can each be adjusted to a different vertical height using or angle using a pressure-fit mounting system or a variable-angle mounting plate in order to be securely fixed between varying opposing surfaces.

As shown in FIG. 5, for example, the system 67 can include a plurality of elongate support members 10 aligned in a substantially-vertical orientation between a corresponding plurality of opposed support 61 and upper surfaces 64, 68, 69. As shown in FIG. 5, bottom mounting plates 66 can secure each first end 11 of each elongate support member 10 to the support surface 61. In this example, each bottom mounting plate 66 comprises a base configured to be secured by fasteners to both the threaded receivers 34 of the elongate support member 10 and to the support surface 61. Furthermore, in this particular illustration, the entire support surface 61 is a standard mounting surface. Of course, one will appreciate that if the support surface 61 varied and comprised non-standard mounting surfaces, such as the support surface 24 shown in FIG. 1, an assembler could alternatively use variable-angle mounting plates (e.g., FIG. 3 or 4) in place of the bottom mounting plates 66.

Similarly, top mounting plates 60 can be used to secure each second end 13 of each elongate support member 10 to the standard upper mounting surface 64. Each top mounting plate 60 can be configured to be secured to the upper mounting surface 64 via fasteners and to each elongate support member 10 by means of a pressure-fit mounting system 18. For example, FIG. 5 shows that one elongate mounting member 15a is configured to be secured to an angled (or non-standard) mounting surface 68, while another elongate mounting member 15b is configured to be secured to a standard mounting surface 64.

As such, FIG. 5 also shows that the system 67 can also include variable angle mounting plates 14 (with member 15a) securing each second end of each elongate support member 10 to any non-standard upper surfaces 68, 69. Thus, each of the elongate support members 10 can be individually adjusted in height and angle between the opposed support 61 and upper surfaces 64, 68, 69. Furthermore, a plurality of panels 62 can be secured between the plurality of elongate support members 10. As shown in FIG. 5, the plurality of panels 62 can be secured to the plurality of elongate support members via a plurality of spider brackets 65. In additional embodiments, the plurality of panels 62 can be secured to the plurality of elongate support members via Y and or acute-angle brackets, as described more fully below (e.g., FIGS. 7, 8).

As shown in FIG. 5, the spider brackets can include two arm spider brackets 65, single arm spider brackets 65a, and four arm spider brackets 65b. The manufacturer can attach the spider fittings to the uprights (i.e., elongate support members 10) in the desired location with the drop in t-nut and a countersunk bolt through the face of the spider bracket 65, 65a, 65b. The manufacturer can drill a hole in the panels 62, and thread a cap through the panel into mounting opening an arm of the spider bracket 65, 65a, 65b.

Figure 6:
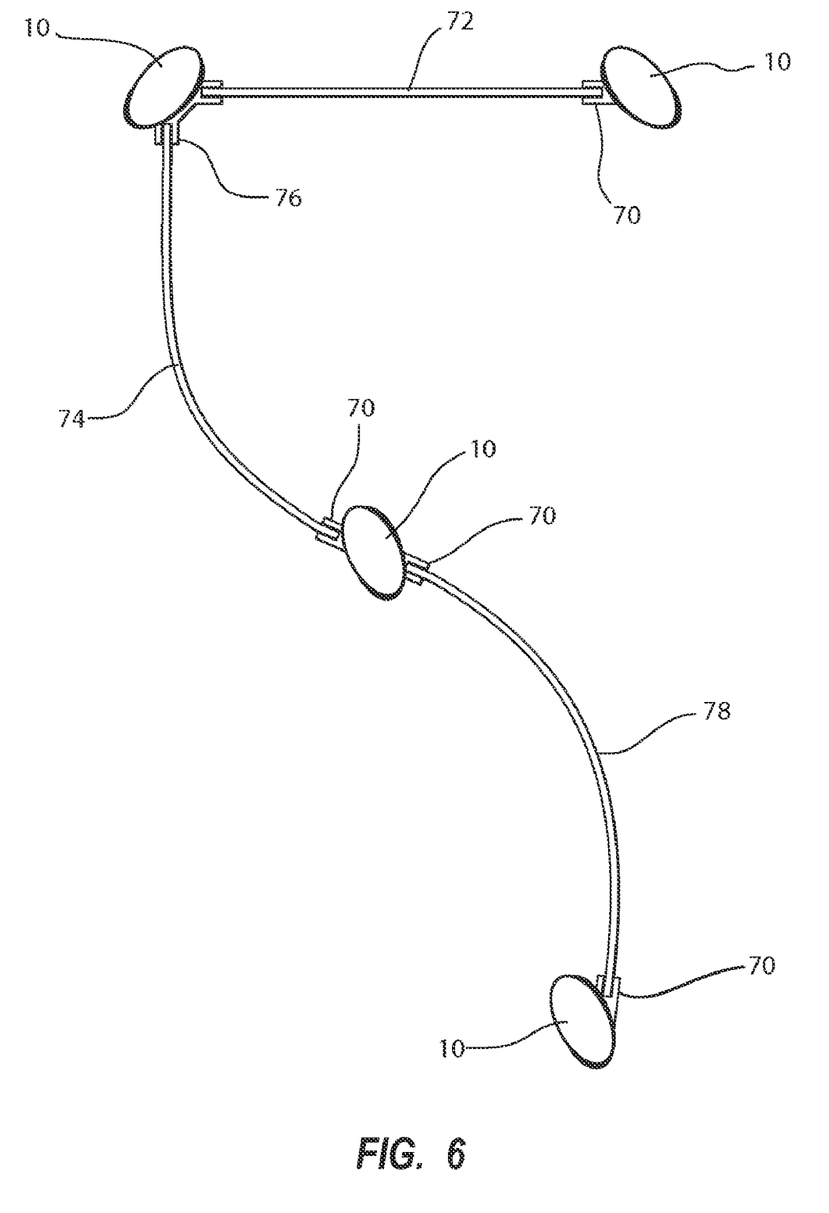
FIG. 6 illustrates a schematic diagram of a top view of a plurality of panels mounted between elongate support members configured using one or more components in accordance with one or more implementations of the present invention.

The present invention also contemplates mounting panels in a wide variety of linear and non-linear configurations. For example, FIG. 6 illustrates a schematic diagram of a top view of a plurality of panels 72, 74, 78 mounted between elongate support members 10. The elongate support members 10, in these cases, are configured using one or more brackets that allow an angled or even curved assembly. In general, these assemblies can be accomplished using the elongate support members described herein in conjunction with one or more Y brackets 76 and/or acute angle brackets 70. As discussed more fully below, these Y and/or acute angle brackets allow the panels to be oriented at varying angles with respect to the elongate support members 10.

Figure 7:
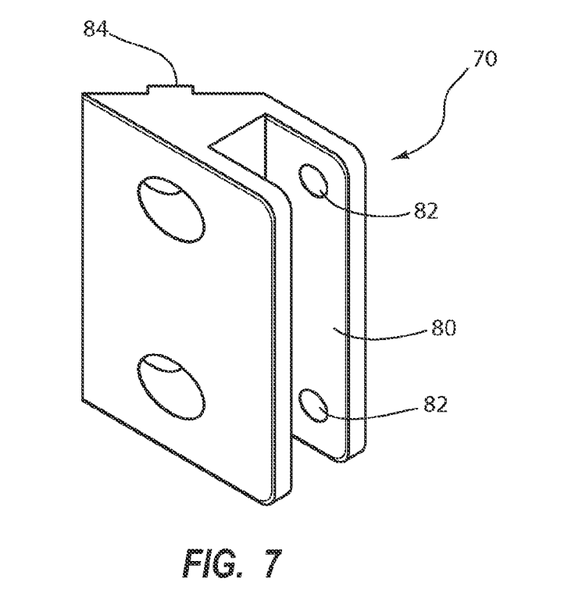
FIG. 7 illustrates a perspective view an acute-angle bracket in accordance with an implementation of the present invention.

For example, FIG. 7 illustrates a perspective view of an acute-angle bracket 70. The acute-angle bracket 70 can include a mounting protrusion 84 configured to be secured (e.g., slid into and fastened) within a mounting channel 12 of an elongate support member 10. The acute-angle bracket 70 can also include a receiving portion 80 configured to receive an edge of a panel therein. For example, FIG. 7 shows that the acute-angle bracket 70 can also include fastening holes 82 via which the panel can be secured to the acute-angle bracket 70.

FIG. 7 further shows that the receiving portion 80 can be oriented at an angle with respect to the mounting protrusion 84. This allows the acute-angle bracket 70 to mount a panel at an orientation extending at an acute angle relative to a minor axis of an elongate support member 10 as shown in FIG. 6. The ability to mount a panel at an orientation extending at an acute angle relative to a minor axis of an elongate support member 10 allows curved panels 74, 78 to be secured between elongate support members 10 as shown in FIG. 6.

Figure 8:
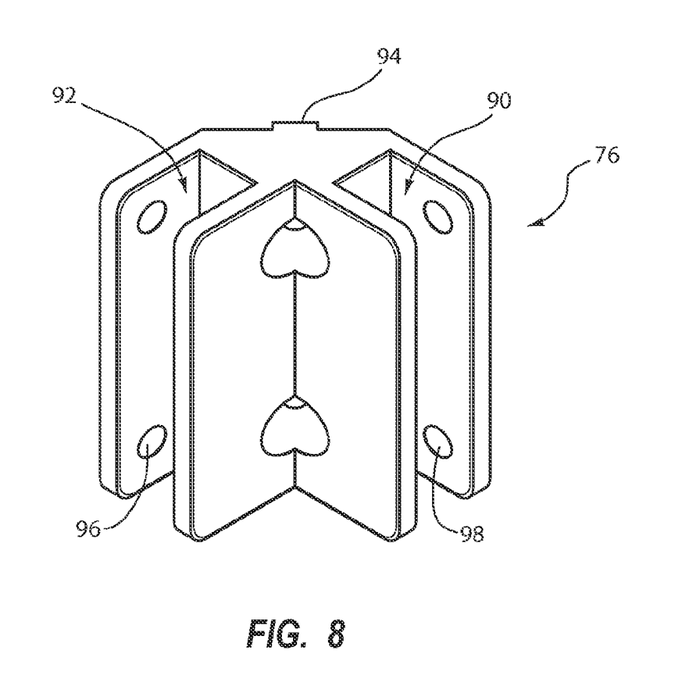
FIG. 8 illustrates a perspective view of a Y bracket in accordance with an implementation of the present invention.

FIG. 8 illustrates a perspective view of a Y bracket 76. The Y bracket 76 can include a mounting protrusion 94, similar to the mounting protrusion 84 described above in relation to the acute-angle bracket 70. As with protrusion 84, the mounting protrusion 94 can be configured to be secured within a mounting channel 12 of an elongate support member 10. The Y bracket 76 can also include two receiving portions 90, 92, each configured to receive and secure an edge of a panel therein. In one implementation, the receiving portion 90 is orthogonally oriented with respect to the receiving portion 92. The orientation of the receiving portions 90, 92 thus enable the Y bracket 76 to secure a first panel 72 to the elongate support member 10 in an orientation extending at an acute angle relative to a minor axis of the elongate support member 10, and secure a second panel 74 to the elongate support member 10 in an orientation substantially orthogonal to the first panel 72 as shown in FIG. 6. FIG. 8 shows that the two receiving portions 90, 92 can also each include fastening holes 96, 98 via which the panel can be secured to the Y bracket 76.

Thus, one will appreciate that the acute-angle bracket 70 and the Y bracket 76 allow panels to be mounted to elongate support members 10 in a wide variety of orientations. Furthermore, the Y bracket allows more than one panel to be secured to the same elongate support member 10, thus reducing the number of elongate support members 10 need to arrange panels in complex configurations. Furthermore, more than one Y bracket 76 can be mounted to a single elongate support member 10. For example, two Y brackets 76 can be secured into an oval, elongate support member, and four Y brackets 76 can be secured to a square, elongate support member.

Figure 9:
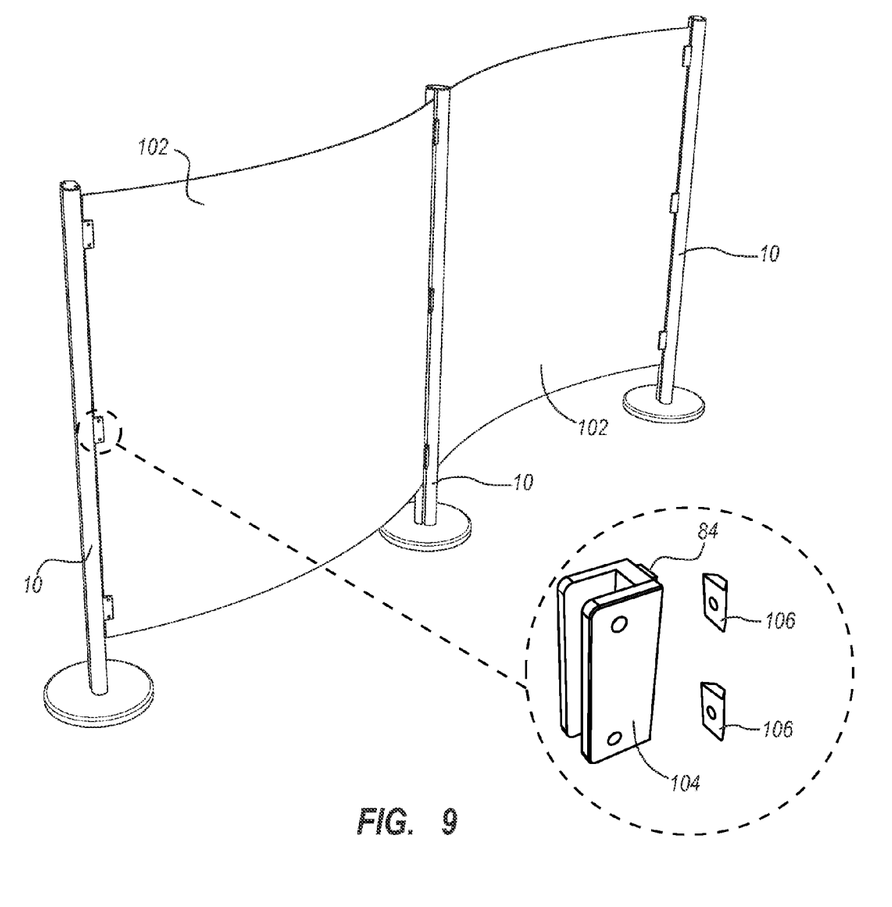
FIG. 9 illustrates a mounted panel and an exploded view of specific components used to mount the panels in accordance with an implementation of the present invention.

FIG. 9 illustrates a mounted panel and an exploded view of specific components used to mount the panels in accordance with an implementation of the present invention. To create this assembly, the manufacturer/assembler can assemble panels 102 between uprights (i.e., elongate support members 10). To do so, the manufacturer/assembler might start with one upright and secure side brackets 104 into position in the mounting channel 12 (FIG. 2) with the drop-in t-nuts 106. In particular, the manufacturer/assembler can drop a t-nut 106 into the mounting channel 12, slide a mounting protrusion 84 of the side bracket 104 into the mounting channel 12, and fasten the side bracket 104 to the t-nut 106. The manufacturer/assembler might then secure the other brackets on the desired number of uprights for the solution. The manufacturer/assembler can secure acute-angle brackets 70, Y brackets 76, or brackets 65 to elongate support members 10 by inserting a mounting protrusion on the back of the bracket 70, 76, 65 into the mounting channel 12 and using t-nuts 106 in a similar manner.

The present invention also includes methods of assembling and securing panels as a partition, display, treatment, or barrier between the opposing mounting surfaces. The following describe at least one implementation of a method of mounting the variable-angle panel mounting members 15a and 15b shown in FIG. 5 with panels therebetween. Of course, as a preliminary matter, one of ordinary skill in the art will recognize that the methods explained in detail can be modified to install a wide variety of configuration to a wide variety of standard and non-standard opposing surfaces spaced apart at varying distances using one or more components of the present invention.

According to one method of the present invention, for example, at least one panel 62 can be secured either directly, or via brackets 65, to the mounting channels 12 of opposing elongate support members 10 of variable-angle panel mounting members 15a, 15b. After assembling the panels 62 to the elongate support members 10, a manufacturer/assembler can then attach bottom mounting plates 66 to the elongate support members 10. The manufacturer/assembler can then secure variable-angle mounting plate 14 to the elongate support member 10 of variable-angle panel mounting member 15a, and further secure the top mounting plate 66 to the elongate support member 10 of variable-angle panel mounting member 15b using pressure-fit assemblies 18.

To do so in at least one implementation, the manufacturer can insert a threaded-rod 20 into the female connection member 46 of the variable-angle mounting plate 14 on one end, and into the top mounting plate 60 on the other end, and secure the threaded-rods 20 with a set screw, as desired. The manufacturer can then thread barrel nuts 22 and lock nuts (not shown) on to the threaded-rods 20. In general, the manufacturer/assembler will want to ensure that the lock nuts are above, or closer to the variable-angle mounting plate 14 (and the top mounting plate 60) than to the barrel nuts 22.

Having assembled the partition, the manufacturer can then lift the assembly upright, and insert the threaded-rods 20 of the pressure-fit mounting systems 18 into the center through-holes 32 of the elongate support members 10. The manufacturer can then move the partition into place. Thereafter, the manufacturer can thread the barrel nuts 22 towards the elongate support members 10, pushing the variable-angle mounting plate 14 and the top mounting plate 60 towards the upper surfaces 68, 64. When the base 40 of the variable-angle mounting plate 14 reaches the upper surface 68, the pivot 44 can be adjusted to align the base 40 with the upper surface 68, so they are essentially flush. This also ensures that the elongate support member 10 is in a vertical orientation. When the partition is in place, the manufacturer can thread the lock nuts tight against the barrel nuts 22, which secures them together in place. The manufacturer can then bolt the bottom mounting plates 66 securely to the support surfaces 61, the variable-angle mounting plate 14 to the upper surface 68, and the upper mounting plate 60 to the upper standard surface 68 with screws or other fasteners.

Accordingly, the various features and components of the present invention allow panels to be mounted between a wide variety of opposing support surfaces, whether standard or non-standard, and whether spaced at a single distance or varying distances. Thus, the various features and components of the present invention provide great flexibility in terms of mounting style or arrangement. That is, they can be erected in any number of configurations, almost regardless of dimensional characteristics of the design space. This is possible at least in part since the mounting systems of the present invention do not require complicated hardware and installation processes (thus they can be readily assembled and disassembled). This is also at least in part since support members can be easily modified to securely mount to almost any spacing between a ceiling and floor (or other similar opposed support structures), and since the mounting surfaces/interfaces can be angled to almost any suitable angle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A panel mounting system configured to mount one or more panels in a vertical orientation, comprising:
    a plurality of vertical elongate support members each including an elongated mounting channel; and
    a plurality of panel mounting brackets adapted to be secured to the plurality of vertical elongate support members at the elongated mounting channels thereof, the plurality of panel mounting brackets comprising at least a first panel mounting bracket comprising:
        an essentially flat back plate having a mounting protrusion extending outwardly from the back plate, the mounting protrusion being adapted to slide in a longitudinal manner into an elongated mounting channel of a vertical elongate support member to secure the back plate thereto; one or more receiving portions joined to the back plate, each receiving portion comprising a channel between two fixed vertical side members, the channel being adapted to receive and secure an edge of a panel therein;
        at least one fastening hole extending through one of the two fixed vertical side members;
        a set screw configured to interface with the at least one fastening hole and secure a panel between the two fixed vertical side members;
        a fastener mounting hole extending through the flat back plate, the mounting hole being positioned between the fixed side members; and
    a fastener configured to interface with the fastener mounting hole and secure the at least a first panel mounting bracket to the vertical elongate support member.

2. The panel mounting system as recited in claim 1, further comprising:
    a first mounting plate adapted to be secured to a first end of one or more of the elongate support members; and a second mounting plate adapted to be secured to an opposing second end of one or more of the elongate supports;
wherein the second mounting plate comprises an adjustable-angle mounting plate adapted to secure the opposing second end of an elongate support member to an angled surface, and adapted to secure the elongate support member in a substantially-vertical orientation, the adjustable-angle mounting plate comprising:
a base adapted to be secured to a mounting surface; and
a female connection member pivotally secured to the base, wherein the female connection member is adapted to pivot through a range of at least 180 degrees with respect to the base.

3. The panel mounting system as recited in claim 2, further comprising a pressure-fit mounting assembly adapted to secure the second end of the elongate support member to the angularly-adjustable mounting plate via pressure between first and second mounting surfaces.

4. The panel mounting system as recited in claim 3, wherein the pressure-fit mounting assembly further comprises:
a threaded-rod adapted to be inserted in a center through-hole of the elongate mounting member; and
a barrel nut adapted to engage the threaded-rod and move the adjustable-angle mounting plate relative to the elongate support member by translating the threaded-rod in and out of the through-hole.

5. The panel mounting system as recited in claim 2, wherein the female connection member is adapted to receive one of a threaded-rod and a panel.

6. The panel mounting system as recited in claim 5, wherein the female connection member is adapted to swivel through a range of 360 degrees with respect to the base.

7. The panel mounting system as recited in claim 1, wherein:
the one or more panel mounting brackets include at least one Y bracket securable in a mounting channel; and
wherein the at least one Y bracket is adapted to secure a first panel to the elongate support member in an orientation extending at an acute angle relative to mounting channel; and
the at least one Y bracket is adapted to secure a second panel to the elongate support member in an orientation substantially orthogonal to the first panel.

8. The panel mounting system as recited in claim 1, wherein the one or more panel mounting brackets include at least one acute-angle bracket securable into a mounting channel and adapted to secure a panel to an elongate support member in an orientation extending at an acute angle relative to the elongated mounting channel.

9. The panel mounting system as recited in claim 1, wherein one or more of the elongate support members comprise an oval cross-section.

10. A panel mounting system configured to mount a plurality of panels relative to another each other, the panel mounting system comprising:
a plurality of elongate support members each including an elongated mounting channel; and
a plurality of panel mounting brackets adapted to be secured to an elongate support member at the elongated mounting channel thereof and couple a panel to the elongate support member, the plurality of panel mounting brackets comprising at least a first panel mounting bracket comprising:
an essentially flat back plate having a mounting protrusion extending outwardly from the back plate, wherein:
the mounting protrusion is adapted to slide in a longitudinal manner into the elongated mounting channel to secure the panel mounting bracket to the elongate support member, and
the flat back plate is adapted to abut against an outer surface of the elongate support member when the mounting protrusion thereof is secured within the elongated mounting channel,
one or more openings formed through the back plate, the one or more openings providing access through the panel mounting bracket for securing the panel mounting bracket within the elongated channel of the elongate support member, and
at least one arm extending from the back plate, the at least one arm comprising a mounting hole extending therein, the mounting hole being adapted to receive and secure therein a fastener, wherein the fastener is adapted to hold a panel against the back plate and support the panel;
wherein the one or more openings formed through the back plate and the mounting hole extend parallel to each other;
wherein two or more of the panel mounting brackets comprise a spider bracket including one, two, or four arms, and
each arm of each respective spider bracket is coupled a different panel than any other arm of the respective spider bracket.

11. The system as recited in claim 10, wherein each panel mounting bracket is secured at its mounting protrusion to a t-nut positioned within an elongated mounting channel of one of the plurality of elongate support members.

12. The system as recited in claim 11, wherein each panel mounting bracket is secured to a t-nut by a fastener extending through the opening of the panel mounting bracket and into the t-nut.

13. The system as recited in claim 11, wherein each t-nut comprises a trapezoid shaped cross-section.

14. The system as recited in claim 10, wherein one or more of the elongate support members comprise an oval cross-section.

15. A panel mounting system comprising:
a first elongate support member and a second elongate support member, each of the first and second elongate support members including a first end, and opposing second end, and an elongated mounting channel extending between the first and second end, the second elongate support member being positioned parallel and offset from the first elongate support member;
a first panel mounting bracket secured to the first elongate support member;
a second panel mounting bracket secured to the second elongate support member;
wherein each of the first and second panel mounting brackets comprise:
an essentially flat back plate having a mounting protrusion extending outwardly from the back plate,
the mounting protrusion being adapted to be inserted into an elongated mounting channel at any of a plurality of positions between the first and second ends of the elongate support member and slide in the elongated mounting channel along the elongate support member,
the flat back plate being adapted to abut against an outer surface of the elongate support member when the mounting protrusion is secured within the elongated mounting channel of the elongate support member, one or more openings extending through the back plate, the one or more openings providing access through the panel mounting bracket for securing the panel mounting bracket within the elongated mounting channel of the elongate support member, and at least one arm extending from the back plate, wherein:
each arm comprises a mounting hole extending therein, wherein the first panel mounting bracket consists of a single arm and the second panel mounting bracket consists of two arms;

a panel extending between the first and second elongate support members, wherein:
a fastener extends through the first portion of the panel and into the mounting hole of the single arm of the first panel mounting bracket, and
a fastener extends through the second portion of the panel and into the mounting hole of one of the arms of the second panel mounting bracket.

16. The panel mounting system as recited in claim 15, wherein the panel comprises a decorative panel formed from resin, polycarbonate, or glass.

17. The panel mounting system as recited in claim 15, wherein each of the first and second panel mounting brackets is secured at its mounting protrusion to a t-nut positioned within an elongated mounting channel of one of the first and second elongate support members.

18. The panel mounting system as recited in claim 15, wherein:
the panel is vertically positioned in front of and perpendicular to the elongated mounting channels of the first and second elongate support members.

19. The panel mounting system as recited in claim 15, wherein:
the panel is curved.

20. The panel mounting system as recited in claim 15, wherein the panel is aligned in line with the elongated mounting channel of the second elongate support member.

* * * * *

UNITED STATES PATENT AND TRADEMARK OFFICE
CERTIFICATE OF CORRECTION

PATENT NO. : 8,371,460 B2
APPLICATION NO. : 13/427996
DATED : February 12, 2013
INVENTOR(S) : Ghatikar et al.

It is certified that error appears in the above-identified patent and that said Letters Patent is hereby corrected as shown below:

In the Specification

Column 1
Line 55, change "uprights" to --upright--

Column 4
Line 5, change "view an" to --view of an--
Line 39, change "by plurality" to --by a plurality--
Line 41, change "it that" to --is that--
Line 50, change "with a" to --with--

Column 5
Line 14, change "received" to --receive--

Column 6
Line 47, change "about feet" to --about three feet--

Column 7
Line 9, change "comprising plurality" to --comprising a plurality--

Column 8
Line 47, change "enable" to --enables--
Line 61, change "need" to --needed--

Column 9
Line 28, change "configuration" to --configurations--

Signed and Sealed this
First Day of October, 2013

Teresa Stanek Rea
*Deputy Director of the United States Patent and Trademark Office*

CERTIFICATE OF CORRECTION (continued)
U.S. Pat. No. 8,371,460 B2

In the Claims

Column 11
Line 55, Claim 10, change "another each" to --each--

Column 12
Line 26, Claim 10, change "coupled a" to --coupled to a--